Sept. 24, 1929.  A. F. RUTHVEN  1,729,362
CURRENT MOTOR
Filed June 24, 1926  3 Sheets-Sheet 1
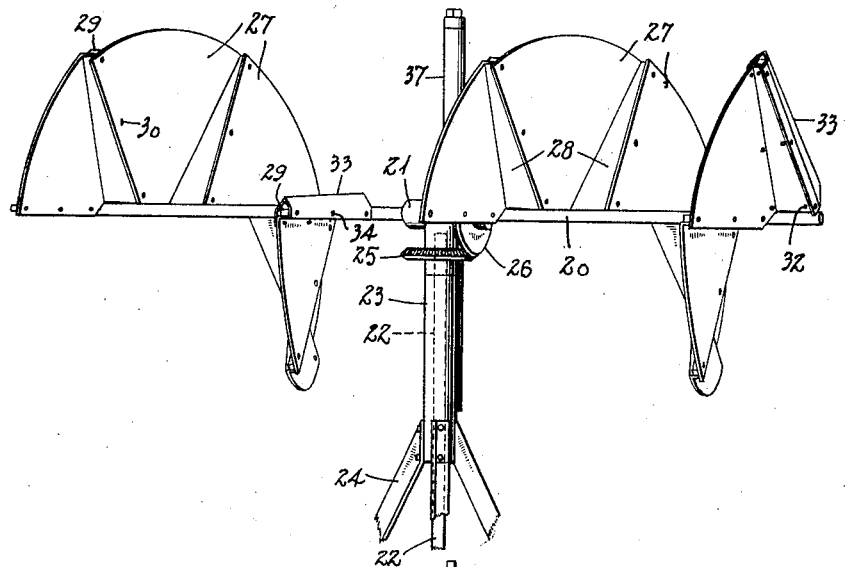
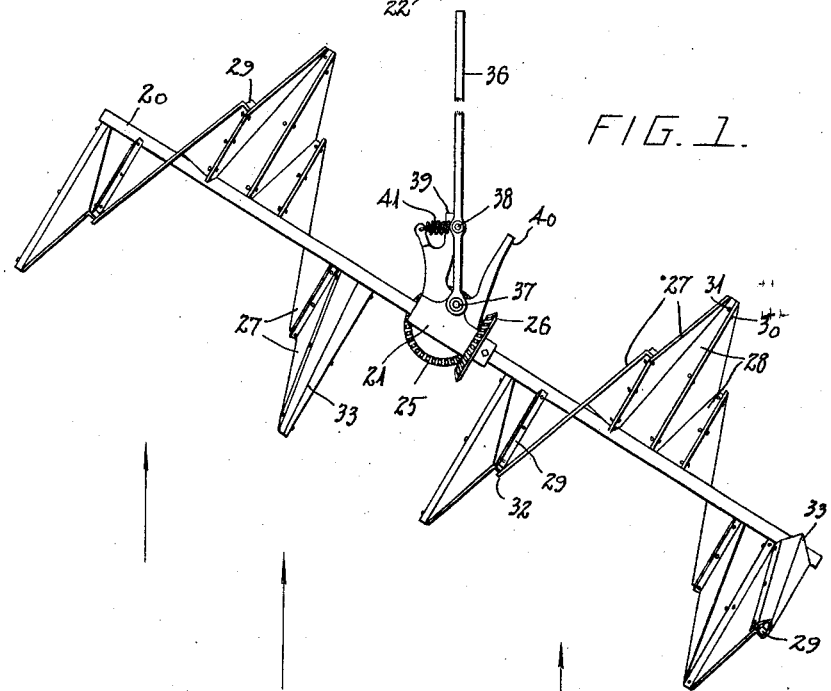

Sept. 24, 1929.   A. F. RUTHVEN   1,729,362
CURRENT MOTOR
Filed June 24, 1926   3 Sheets-Sheet 2
FIG. 3.
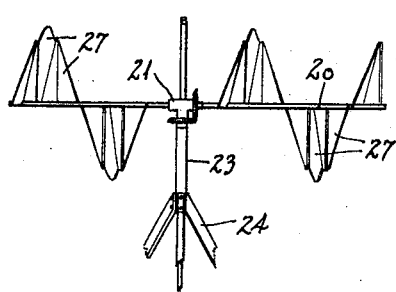
FIG. 4.
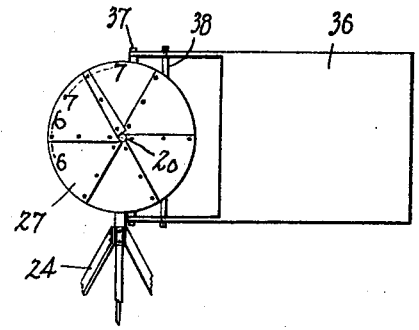
FIG. 5.
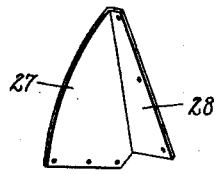
FIG. 6.
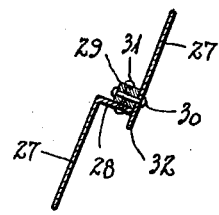
FIG. 7.
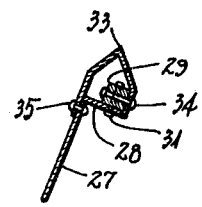
FIG. 8.   FIG. 13.   FIG. 9.
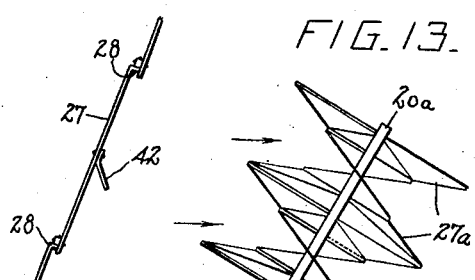
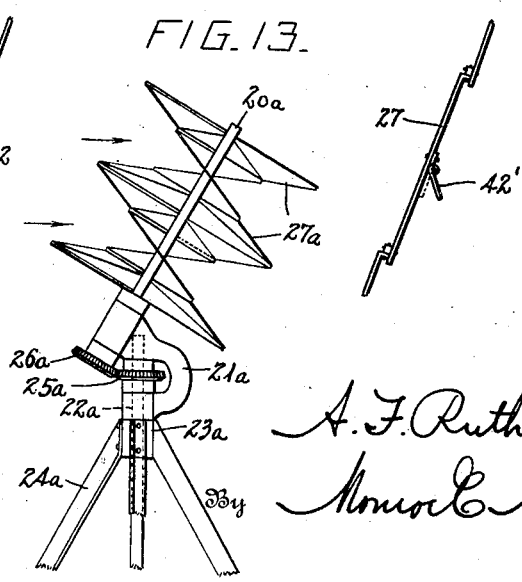
Inventor:
A. F. Ruthven
By Monroe E. Miller
Attorney.

Sept. 24, 1929.   A. F. RUTHVEN   1,729,362
CURRENT MOTOR
Filed June 24, 1926   3 Sheets-Sheet 3

Inventor:
A. F. Ruthven
By Monroe E. Miller
Attorney.

Patented Sept. 24, 1929

1,729,362

UNITED STATES PATENT OFFICE

ALBERT F. RUTHVEN, OF CLEVELAND, OHIO

CURRENT MOTOR

Application filed June 24, 1926. Serial No. 118,281.

The present invention relates to current motors, such as are adapted to be operated by air or water currents, and the invention aims to provide novel and improved means for obtaining power from air or water current with a construction that is simple but nevertheless practical and efficient.

Another object of the invention is the provision of a novel and improved rotor adapted to be rotated in an efficient manner by the current and actuated by both the deflective and direct pressure actions of the current against the rotor, with substantially no back pressure.

A further object of the invention is the provision of a rotor of the kind indicated comprising a helix built up of sections or sectors.

Still another object is the provision of a current motor embodying one or more of the rotor units in combination with means for changing the angle thereof to the current, when the current pressure becomes abnormally high, so as to retard or stop the rotation of the rotor units, in order to prevent excessive power being transmitted through the motor.

A still further object is the provision of a helical rotor which may be of different diameters and lengths according to the power desired, and which will be effective at opposite sides of the axis of rotation for transmitting power from the current to the rotor, thereby utilizing all of the sections or portions of the rotor in all positions thereof for taking power from the current.

The invention has for another object the provision of novel means for mounting the rotor in relation to the line of movement of the current, and for movement so as to be presented at the proper angle to the current.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of a simple form of current motor embodying the improvements.

Fig. 2 is a front elevation thereof, looking in the direction of the flow of current.

Fig. 3 is a front elevation, on a reduced scale, showing the rotor in position at right angles to the flow of current, such as when the current pressure is abnormally high, resulting in the slowing down or stopping of the rotor.

Fig. 4 is a side elevation of the device as seen in Fig. 3.

Fig. 5 is a perspective view of one of the sections or sectors of the rotor.

Fig. 6 is an enlarged sectional detail on the line 6—6 of Fig. 4.

Fig. 7 is an enlarged sectional detail on the line 7—7 of Fig. 4.

Figs. 8 and 9 are edge views of the rotor illustrating modifications.

Fig. 13 is a side elevation depicting another modification.

Figure 10:
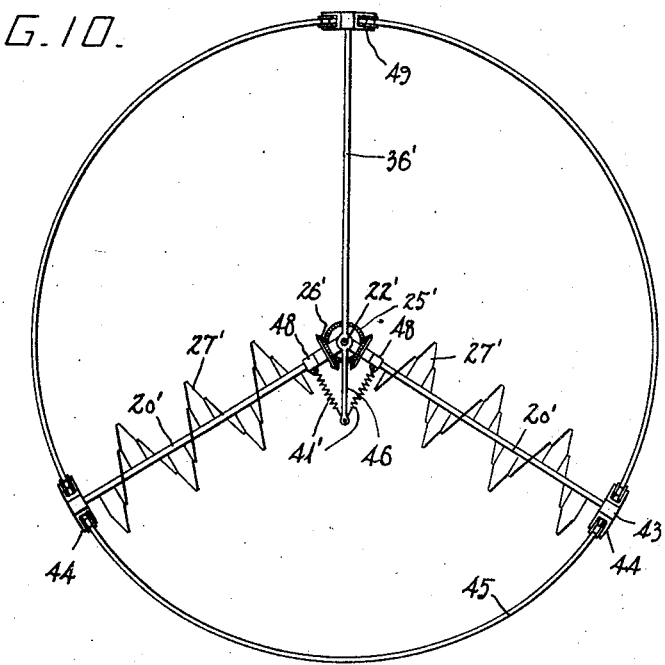
Fig. 10 is a plan view illustrating a multiple rotor motor.

As shown in Figs. 1, 2, 3 and 4, a pair of rotor units is mounted on a horizontal shaft 20, which may be solid or tubular, and which is journaled for rotation between its ends in a T-fitting 21 that is mounted for rotation on the upper terminal of a vertical shaft 22, suitable anti-friction radial and thrust bearings being used between said shafts and fitting for the free turning movement of the parts. The fitting 21 is swivelled on the shaft 22 in order that the shaft 20 may turn in a horizontal plane about the vertical axis of the shaft 22. The shaft 22 is journaled in a bearing 23 carried by a suitable tower or frame 24 which supports the motor, and a bevel gear 25 is secured on the shaft 22 between the fitting 21 and bearing 23 and meshes with a bevel gear 26 secured on the shaft 20, whereby the power is transmitted from the rotor shaft 20 to the shaft 22.

A rotor unit is mounted on each arm of the shaft 20 and is of helical or screw form so as to constitute a helix. The rotor unit or helix may have any number of convolutions or turns, and is built up to any desired length by duplicate sections or sectors 27 that are cheaply and conveniently stamped from suitable sheet metal. Each section 27 is provided along its leading edge with an angularly extending flange 28 increasing in width from the outer to the inner end thereof. Radial bars or arms 29 are secured in any suitable manner to the shaft 20 at longitudinally spaced points along said shaft and are located in the helical line of the rotor unit, for the attachment of the sections 27. The trailing edge portions of the sections 27 extend across the arms 29 and are secured thereto by means of rivets, bolts or other securing elements 30, and the flanges 28 have their edges overlapping the arms 29 and secured thereto by means of rivets, bolts or other securing elements 31, whereby the rotor unit is in the form of a helix with steps at intervals along its length formed by the flanges 28 which space the leading edge of each section 27 and the trailing edge of the adjacent section apart. The trailing edges 32 of the sections 27 project beyond the corresponding arms 29 and flanges 28 to form pockets or "buckets" to catch the current. The steps or offset portions of the rotor constitute direct drive portions to be moved by the direct pressure of the current thereagainst. The sections 27 may be flat, so that with the flanges 28, the sections when assembled will be in the form of a helix having the steps or offsets.

At the leading end of the rotor helix, a nose piece 33 of sheet metal or other suitable material is disposed in front of the flange 28, to cut the air or water and decrease the resistance. As shown, the nose piece 33 is disposed astride the leading flange 28 and arm 29 with one edge portion overlapping the arm 29 and secured thereto, by securing elements 34, and with the opposite edge portion of the nose piece overlapping the corresponding section 27 and secured thereto, as at 35.

The shaft 20, as seen in Fig. 1, is disposed obliquely relatively to the direction of the current, indicated by the arrows, and, as seen in Figs. 1 and 2, the upper portion of the rotor moves away from the observer, while the lower portion moves toward the observer. With this arrangement of the rotor, the rotor sections 27 above the shaft 20 are disposed at substantially an angle of forty-five degrees to the line of movement of the current, while the sections 27 below the horizontal plane of the shaft 20 are substantially in line with the flow of current. Thus, the current impinging against the upper sections 27 and flanges 28 thereof will exert direct pressure tending to move the upper portion of the rotor with the current, assisted by the deflection action of the current against the upper sections 27 tending to shift them toward the left in the arrangement as shown. The pockets or buckets formed by the flanges 28 and trailing edges 32 of the sections 27 will catch the air or water so that the direct pressure thereof is effective for turning the rotor. As the sections 27 move under the horizontal plane of the shaft 20, the flanges 28 are located behind the sections 27 in front, as seen in Fig. 2 below the shaft 20, thereby avoiding back pressure on the rotor, inasmuch as the current does not impinge against the flanges 28 as they move against the current below the shaft 20. Furthermore, the sections 27 being arranged obliquely as they move below the shaft 20 will, by the impinging of the current against them, result in a deflective action of the current against the lower sections 27, to assist in the actuation of the rotor. Thus, the action of the current on the upper portion of the rotor will, by direct pressure and deflection, actuate the rotor, and the action of the current on the lower portion of the rotor will assist in the movement of the rotor, so that there is no back pressure tending to impede the movement of the rotor, and the entire length of the rotor is utilized for obtaining power from the current.

The rotor may be built in different lengths and diameters, and in being composed of the sections 27 and arms 29 is strong in construction as well as cheap in manufacture. The present rotor combines the advantages of previous rotors having their axes at right angles and parallel with the current, and eliminates objections thereof.

In order that the rotor may change its position when the direction of current changes, especially when using the device as a wind motor, a tail 36 is mounted in rear of the rotor and is hingedly connected, as at 37, with the fitting 21 and means is provided between the tail and fitting or supporting member 21 for limiting the relative oscillation of the shaft 20 and tail 36. As shown, a vertical rod 38 is carried by the tail 36 and is movable between stops 39 and 40 projecting rearwardly from the fitting 21, the rod 38 and stop 39 contacting in the normal position of the parts, and the rod 38 and stop 40 contacting when the shaft 20 and tail 36 are moved at right angles with one another. A tension spring 41 connects the rod 38 and fitting 21 tending to move the shaft 20 and tail 36 to a relative oblique position, as seen in Fig. 1. Thus, the tail 36 will project in the direction of the current, so that as the current changes the rotor will be adjusted about the vertical axis of the shaft 22 to properly present the rotor to the current.

The rotor unit of the arm of the shaft 20 which is foremost (at the right as seen in Figs. 1 and 2) is larger or of greater area than the other rotor unit. As shown, the foremost or right hand rotor unit has an additional section 27. Therefore, the pressure against the right hand rotor unit is greater than against the left hand rotor unit, but during normal flow of current, the spring 41 will maintain the shaft 20 and tail 36 in relative position as seen in Figs. 1 and 2, so that the rotor will be disposed obliquely relatively to the current. Should the current pressure become abnormally high, the excessive pressure against the right hand rotor unit will swing the right hand rotor unit rearwardly with the current, the tail 36 remaining in the line of the current, and the spring 41 being stretched. Thus, the shaft 20 is moved toward or to a position at right angles with the current and tail 36, as seen in Fig. 3. This will result in the upper and lower portions of the rotor being exposed substantially equally to the current, thereby increasing the pressure against the lower portions of the rotor, resulting in the rotation of the rotor being retarded or stopped. The shaft 20 is moved to or near a position at right angles with the current, the pressure against the rotor above and below the shaft 20 will be equalized, thereby retarding or stopping the rotor, and preventing the excessive speed of the rotor and transmission of power therefrom.

When the current pressure subsides the spring 41 will assert itself and return the shaft 20 to its normal oblique position, so that the rotor will operate again. In this way, by the simple arrangement shown and described, the motor is controlled for excessive current pressure, to reduce the speed of the rotor and avoid excessive power.

Fig. 8 illustrates the use on the front surface of the rotor section 27 of a blade 42 arranged at an acute angle with the section 27 to catch the air or water in addition to the flanges 28, to assist in the direct drive of the rotor, said blades 42 when moving against the current having their pockets at the rear so as to offer little or no resistance. Fig. 9 shows the blade 42' hingedly connected with the rotor section 27 so as to open up, as seen in full lines, when moving with the current, and to fold against the section 27, as seen in dotted lines, when moving against the current. The blades 42 or 42' may be used on the rotor sections, especially when said sections are of large size, to increase the power transmitted from the current to the rotor.

Figure 11:
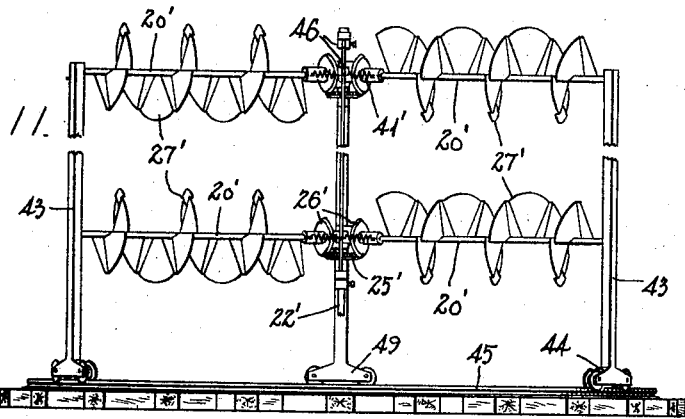
Fig. 11 is a front elevation of said multiple rotor motor.
Figure 12:
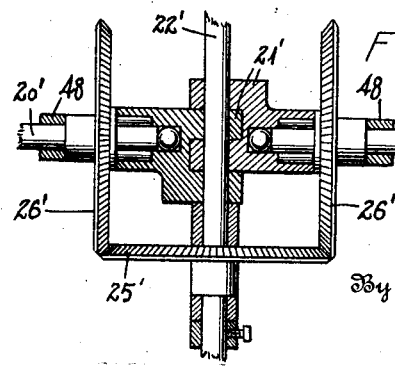
Fig. 12 is a sectional detail thereof.

Figs. 10, 11 and 12 illustrate a motor composed of a number of rotors, which may be built in large size when high power is desired. The rotors 27' are arranged in forwardly diverging pairs, and any number of pairs may be arranged in vertically spaced relation. Each rotor 27' is mounted on a shaft 20', and said shafts have their inner terminals mounted for rotation within fittings 21' mounted for oscillation on the vertical shaft 22'. Bevel gears 25' secured on the shaft 22' mesh with bevel gears 26' secured on the shafts 20', and the shafts 20' of each pair rotate in opposite directions, so that the rotors 27' at the opposite sides are in inverted positions, the rotors at one side being reverse to the rotors at the opposite side, as seen in Fig. 11, but the operation thereof being substantially the same.

The outer ends of the shafts 20' are journaled in pedestals 43 mounted on carriages 44 that move on a circular track 45, thereby permitting the shafts 20' to turn around the shaft 22'.

The tail 36' is connected with the shaft 22' to rotate around said shaft, and said tail has forwardly extending arms 46 connected by the tension springs 41' with collars 48 swivelled on the shafts 20', thereby moving the shafts 20' forwardly to the oblique positions as shown in Fig. 10, suitable stops being provided between the fittings 21' and tail 36' to limit the relative oscillatory movements of the shafts 20' and tail 36'. The rear end of the tail 36' may also be mounted on a carriage 49 movable on the track 45.

The operation of each rotor is the same as that hereinbefore described, and the power from all of the rotors is transmitted to the shaft 22' from which the power may be taken in any suitable manner. The tail 36' projecting in the direction of current flow will, through the springs 41', hold the rotors at the desired oblique positions relatively to the current. Should the current pressure become abnormally high, the rotors will be swung rearwardly toward or to a position at right angles to the tail 36' and current, thereby retarding or stopping the rotors. When the current pressure subsides the springs 41' will assert themselves and again swing the shafts 20' forwardly so that the rotors will again operate under normal current pressures. The rotors and tail may also rotate on the track 45 around the shaft 22' when the current changes.

The motors as illustrated are intended especially for use with air currents, it being apparent that the motors may also be used as water motors in which event provisions as to changes in the direction of current may not be necessary.

Fig. 13 illustrates a simple motor construction wherein the rotor shaft 20ᵃ is inclined to be disposed obliquely of the current, and is journaled within a fitting 21ᵃ mounted for turning movement on the upper terminal portion of the vertical shaft 22ᵃ which is journaled in a bearing 23ᵃ of a supporting tower or frame 24ᵃ. A bevel gear 25ᵃ on the shaft 22ᵃ meshes with a bevel gear 26ᵃ on the lower end of the shaft 20ᵃ. A double rotor, having two helixes, is provided on the shaft 20ª, illustrating the use of more than a single helix, although a single helix may be used in this construction. The axis of the helix is oblique in a vertical plane relatively to the current, instead of in a horizontal plane as in the motors hereinbefore described, and by tilting the rotor shaft 20ª rearwardly away from the current, the rotor is operated substantially the same as the rotors hereinbefore described. Furthermore, no tail is necessary, inasmuch as the rotor will assume different position around the vertical axis of the shaft 22ª as the direction of current changes, so that the rotor will serve as its own tail by being turned around the vertical axis so as to lean with the current, as seen in Fig. 13, the current flowing in the direction of the arrow.

Having thus described the invention, what is claimed as new is:—

1. A current motor comprising a rotor helix having offset sections and direct drive portions between them, with said portions arranged to be exposed to the current when moving with the current and to be disposed behind said sections when moving against the current.

2. A current motor comprising a rotor helix comprising sections having their adjacent edges spaced apart and direct drive portions between the adjacent edges of said sections.

3. A current motor comprising a rotor helix disposed obliquely to the current and composed of sections and direct drive portions between the sections, with said portions arranged to receive direct pressure thereagainst when moving with the current and to be arranged behind said sections when moving against the current.

4. A current motor comprising a rotor having helically arranged sections having their adjacent edges offset and provided between said edges with direct drive portions.

5. A current motor comprising a rotor helix composed of sections having direct drive flanges at their leading edges extending to the trailing edges of the adjacent sections, the trailing edges of said sections extending beyond said flanges of the adjacent sections.

6. A current motor comprising a rotor helix including a shaft, radial arms carried by the shaft in a helical arrangement, and helix sectors having trailing edge portions secured to said arms and having angularly extending flanges at their leading edges secured to said arms adjacent to the trailing edges of the adjacent sections, the trailing edges of said sections extending beyond said flanges of the adjacent sections to form pockets.

7. A current motor comprising a rotor helix composed of flat sectors having flanges between their adjacent edges, said flanges increasing in width from their outer to their inner ends.

8. A current motor comprising a rotor helix including a shaft, radial arms carried by said shaft in a helical arrangement, and flat helix sectors having their edge portions secured to said arms and having angularly extending flanges at their leading edges secured to the corresponding arms adjacent to the trailing edges of the adjacent sections, said flanges increasing in width from their outer to their inner ends.

9. A current motor comprising a helix mounted for turning movement about a substantially vertical axis with the helix axis horizontal, and spring means for moving the helix to a position obliquely of the current and permitting the helix to move toward a position at right angles to the current under excessive current pressure.

10. A current motor comprising a rotor helix operable obliquely of the current and mounted for turning movement to assume a position at right angles to the current, and spring means normally holding the helix obliquely of the current and permitting the helix to move, under excessive current pressure, to said right angle position.

11. A current motor comprising a helix operable in a position obliquely of the current, a tail, means for mounting said helix and tail for turning movement about a substantially vertical axis and for the oscillation of the tail and helix relatively to one another, and spring means between said tail and helix normally holding the helix obliquely of the current and adapted to yield to permit the helix to move, under excessive current pressure, to a position at right angles with the tail.

12. A current motor comprising a vertical shaft, a rotor helix having a horizontal axis, a tail, means for mounting said helix and tail for turning movement around said shaft and for the oscillatory movement of the tail and helix relatively to one another, and spring means between said tail and helix normally holding the helix obliquely of the tail and adapted to yield under excessive pressure against the helix to permit the helix to turn to a position at right angles with the tail.

13. A current motor comprising a rotor helix including a shaft, radial arms carried by the shaft in a helical arrangement, and helix sectors having trailing edge portions secured to said arms and having angularly extending flanges at their leading edges secured to said arms adjacent to the trailing edges of the adjacent sections, the trailing edges of said sections extending beyond said flanges of the adjacent sections and flanged outwardly to form pockets.

14. A current motor comprising a helix having portions adapted to open when moving with the current and to close when moving against the current.

15. A current motor comprising a helix having pockets arranged to receive the current when moving with the current and to disappear and be protected behind other portions of the helix, when looking in the direction of flow of the current, when moving counter to the current.

16. A current motor comprising a helix composed of sectors each disposed in a substantially helical position, the adjacent edges of said sectors being offset relatively to one another, and direct drive portions between the adjacent edges of the sectors.

17. A current motor comprising a helix composed of sectors each disposed in a substantially helical position, the adjacent edges of said sectors being offset relatively to one another, and direct drive portions between the adjacent edges of the sectors, the sectors having trailing edge portions projecting beyond said direct drive portions.

18. A current motor comprising a helix composed of flat sectors each disposed in a substantially helical position with the adjacent edges of said sectors offset relatively to one another, and direct drive portions between the adjacent edges of the sectors.

19. A current motor comprising a helix composed of flat sectors each disposed in a substantially helical position with the adjacent edges of said sectors offset relatively to one another, and direct drive portions between the adjacent edges of the sectors, the sectors having trailing edge portions projecting beyond said direct drive portions.

20. A current motor comprising a helix composed of sectors each disposed in a substantially helical position with the adjacent edges of said sectors offset relatively to one another, the leading edges of said sectors having flanges extending toward the trailing edge portions of the companion sectors.

21. A current motor comprising a helix composed of sectors each disposed in a substantially helical position with the adjacent edges of said sectors offset relatively to one another, the leading edges of said sectors having flanges extending toward the trailing edge portions of the companion sectors, the sectors having their trailing edge portions projecting beyond said flanges.

22. A current motor comprising a helix composed of flat plates each disposed in a substantially helical position with the adjacent edges of said plates offset relatively to one another, the leading edges of the plates having flanges extending at an angle therefrom toward the trailing edge portions of the companion plates.

23. A current motor comprising a helix composed of flat plates each disposed in a substantially helical position with the adjacent edges of said plates offset relatively to one another, the leading edges of the plates having flanges extending at an angle therefrom toward the trailing edge portions of the companion plates, said plates having their trailing edge portions projecting beyond said flanges.

24. A current motor comprising a helix composed of sectors each disposed in a substantially helical position with the adjacent edges of said sectors offset relatively to one another, and direct drive portions between the adjacent edges of said sectors and increasing in width from their outer to their inner ends.

25. A current motor comprising a helix composed of flat sheet metal sectors each disposed in a substantially helical position with the adjacent edges of said sectors offset relatively to one another, the sectors having flanges at their leading edges extending at an angle to the trailing edge portions of the companion sectors, and the trailing edge portions of said sectors projecting beyond said flanges.

In testimony whereof I hereunto affix my signature.

ALBERT F. RUTHVEN.